United States Patent [19]

Coleman

[11] Patent Number: 4,711,268
[45] Date of Patent: Dec. 8, 1987

[54] VALVE MANIFOLD

[76] Inventor: Edward R. Coleman, 192 Deerbow Circle SE., Calgary, Alberta, Canada

[21] Appl. No.: 830,830

[22] Filed: Feb. 19, 1986

[30] Foreign Application Priority Data

Jan. 28, 1986 [CA] Canada .................................. 500501

[51] Int. Cl.⁴ .......................................... F16K 11/22
[52] U.S. Cl. .................... 137/597; 137/886; 73/756
[58] Field of Search ............... 137/597, 884, 886, 887; 73/861.42, 861.52, 861.61, 756; 251/360, 215, 264

[56] References Cited

U.S. PATENT DOCUMENTS

| 1,991,621 | 2/1935 | Noll | 251/360 |
| 2,441,483 | 5/1948 | Goehring | 137/597 |
| 2,871,881 | 2/1959 | Hewsar | 137/597 |
| 3,240,230 | 3/1966 | Callahan, Jr. et al. | 137/886 |
| 3,596,680 | 8/1971 | Adams | 137/597 X |
| 3,633,618 | 1/1972 | Blackmore et al. | 137/597 |
| 4,092,865 | 6/1978 | Strybel | 73/756 |
| 4,193,420 | 3/1980 | Hewsar | 137/597 X |
| 4,466,290 | 8/1984 | Frick | 73/756 |
| 4,602,657 | 7/1986 | Anderson, Jr. et al. | 137/597 X |

Primary Examiner—A. Michael Chambers
Assistant Examiner—John C. Fox
Attorney, Agent, or Firm—Harold H. Dutton, Jr.; George H. Dunsmuir

[57] ABSTRACT

Instead of the usual three or five valves a valve manifold includes four valves, namely a pair of line block valves intersecting a longitudinally extending flow passage in the valve body for normally closing inlet passages, an equalizer valve between the line block valves intersecting the flow passage; below the equalizer valve is a vent passage and a vent valve in the vent passage. During operation the line block valves are open to promote the flow of process pressure to the measuring instrument and the equalizer valve is closed to prohibit the flow along the longitudinally extending flow passage. The vent valve is in the open position. By closing the line block valves with respect to the inlet passages, while leaving them open with respect to the flow and outlet passages, closing the vent valve and opening the equalizer valve permits the flow to be balanced between each side of the manifold. Upon opening the vent valve the manifold can be vented.

8 Claims, 5 Drawing Figures

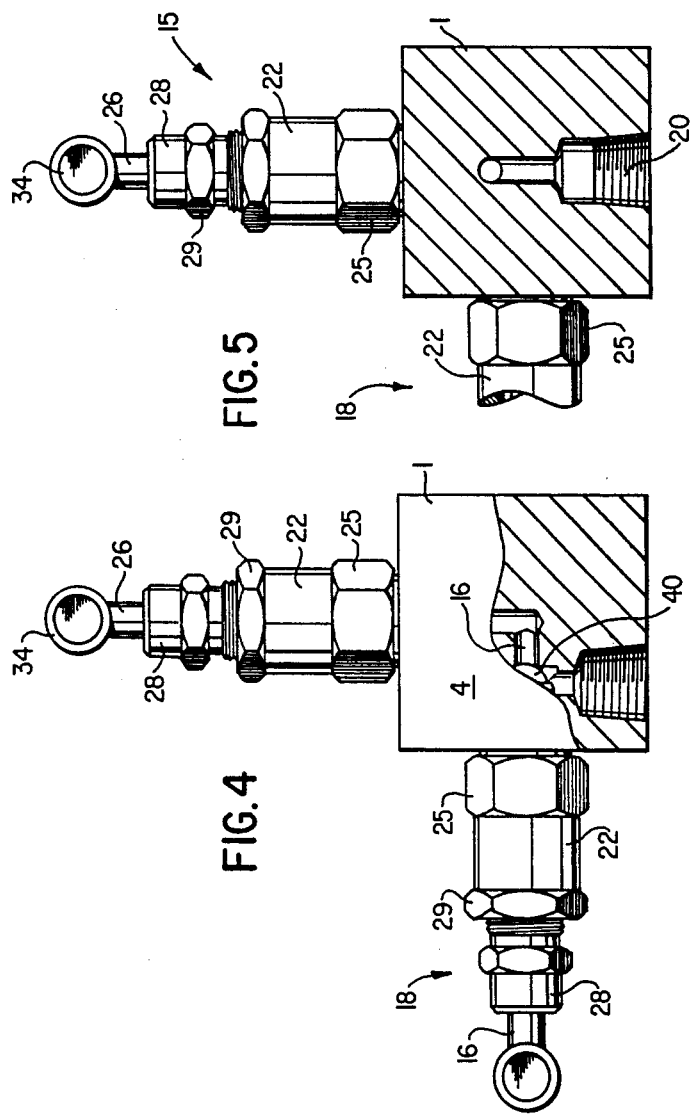

VALVE MANIFOLD

BACKGROUND OF THE INVENTION

This invention relates to a manifold and in particular to a four-valve manifold.

Valve manifolds of the type described herein are, for example, used in fluid process instruments such as flow meters when it is a requirement that fluid be introduced into the instrument simultaneously through two lines. In general, three and five valve manifolds are used for such purpose. Examples of such valves are found in U.S. Pat. Nos. 4,092,865 issued to R. V. Strybel on Jun. 6, 1978; 4,109,536 issued to R. V. Strybel on Aug. 29, 1978 and 4,319,492 issued to J. E. Hewson et al on Mar. 16, 1982.

Currently available three and five valve manifolds possess certain disadvantages. The three valve manifold usually includes two line block valves and an equalizer valve. In order to vent or evacuate process fluid from the manifold it is necessary to remove the main input line from the manifold, i.e. to crack open the coupling used to connect the main input line to the manifold. Such a method of venting can expose the user to potentially dangerous fluids. Moreover, the equalization valve of the three valve manifold cannot readily be checked for leakage from the high to the low pressure side thereof. When using the manifold with a flow meter, leakages of this type may result in the inaccurate flow measurement of the process medium at the recording instrument. Another disadvantage of venting the manifold in the above described manner is that if the equalizing valve should remain closed an unbalancing effect of the fluid will be applied to the recording instrument, which may result in damage to the latter.

The five valve manifold was introduced in an attempt to overcome the problems encountered with the three valve manifold. By increasing the number of valves from three to five there is a substantial increase in manufacturing costs. The introduction of two equalizer valves and one vent valve in the five valve manifold solved the problem of leaks between the high and low pressure side of the manifold, but a problem may still exist when the manifold is vented, i.e. process fluid is evacuated. As with the three valve manifold, the equalizer valve must be in the open position during evacuation of the process pressure, otherwise there may be extensive damage to the recording instrument. Moreover, in order to evacuate a five valve manifold both of the equalizing valves must be open. If the operator fails to open both valves, i.e. opens only one valve, unbalanced pressure will be applied to the recording instrument with possible damage to the instrument.

The object of the present invention is to overcome the above mentioned disadvantages by providing a simple four valve manifold, which possesses the advantages of the five valve manifold, at a lower cost.

SUMMARY OF THE INVENTION

Accordingly, the present invention relates to a valve manifold of the type intended for use with a flow meter or other instrument; comprising body means, flow passage means in said body means extending longitudinally between the ends thereof; inlet passage means in said body means for introducing process fluid into each end of said flow passage means; outlet passage means in said body means at each end of said flow passage means for discharging process fluid to the instrument; line block valve means for closing said inlet passage means and for partially closing said outlet passage means with respect to said flow passage means; vent passage means in said body means between said line block valve means for venting fluid from said flow passage means to the atmosphere; equalizer valve means for closing said flow passage means and said vent passage means for closing the latter down-stream of said equalizer valve means in the direction of vent fluid flow to the atmosphere.

BRIEF DESCRIPTION OF THE DRAWINGS

The invention will now be described in greater detail with reference to the accompanying drawings, which show a preferred embodiment of the invention and wherein:

FIG. 4 is a partly sectioned end view of the valve of FIGS. 1 to 3, the section being taken generally along line IV—IV of FIG. 2; and FIG. 5 is a cross section taken generally along line V—V of FIG. 2.

DESCRIPTION OF THE PREFERRED EMBODIMENT(S)

Figure 1:
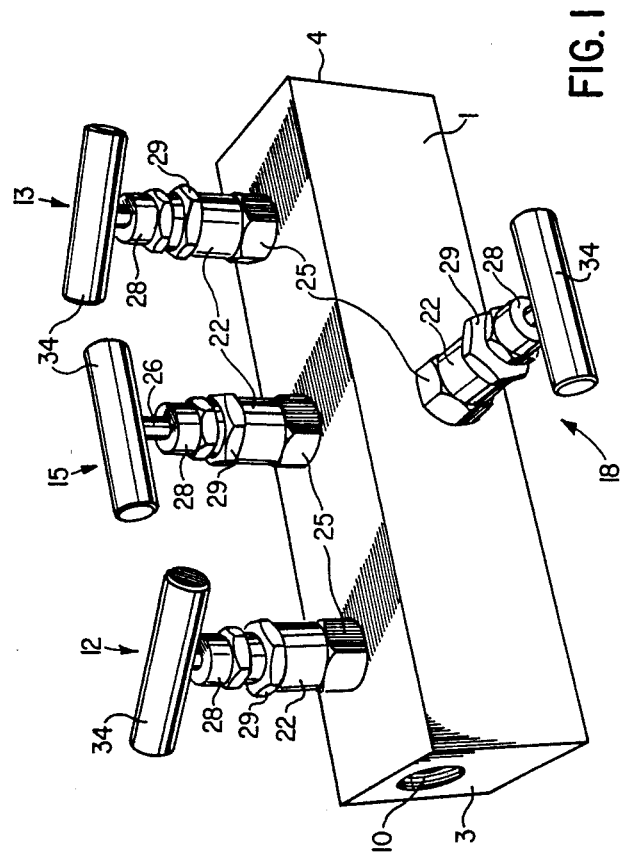
FIG. 1 is a perspective view from above and one end of a valve manifold in accordance with the invention.
Figure 2:
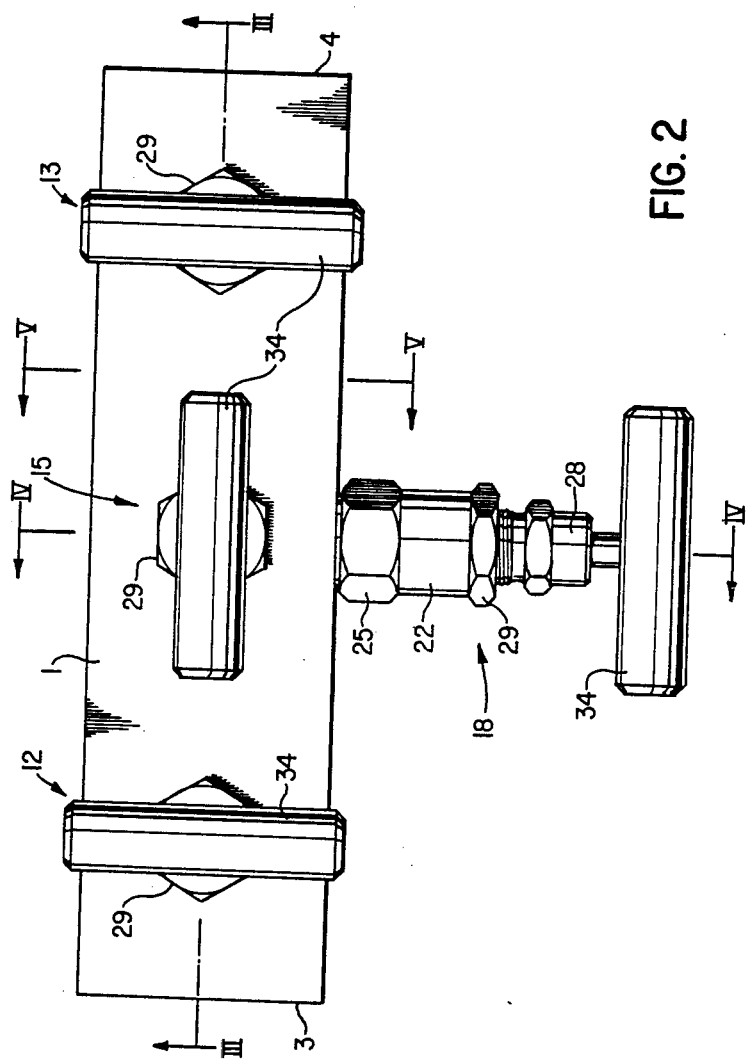
FIG. 2 is a plan view of the valve of FIG. 1.

It should be noted that for the sake of simplicity in the following detailed description one of the sides of the manifold has been chosen as the top.

MANIFOLD STRUCTURE

With reference to the drawings, a valve manifold in accordance with the invention includes a solid metal rectangular body 1. A flow passage 2 extends longitudinally between the ends 3 and 4 of the body 1. Process fluid is introduced into the body 1 via a pair of inlet passages 6 and 7 located close to the ends 3 threaded for receiving the appropriate pressure connectors (not shown). Process liquid entering the inlet passages 6 and 7 normally flows into the passage 2 and out of outlet passages 10, defined by the outer ends of the passage 2. Such outlet passages are threaded for receiving appropriate pressure connectors (not shown). The passages 10 are normally closed from the passages 2, 6 and 7 by line block valves generally indicated at 12 and 13. An equalizer valve generally indicated at 15 is used to close the centre of the passage 2, i.e. to isolate the valves 12 and 13 from each other and to close the passage 2 with respect to an L-shaped vent passage 16. The passage 16 is normally closed by a vent valve generally indicated at 18. Static pressure outlets 20 (for process pressure connection from the manifold to the recording instrument) are provided between the valves 12 and 15, and 13 and 15.

While the valves 12 and 13 can be the same, two different valves have been shown, merely to illustrate the types of valves which can be used in the manifold of the present invention. As will become apparent the differences between the valves 12 and 13 are found in the plug and seat areas thereof.

Each of the valves 12, 13, 15 and 18 include a generally cylindrical bonnet 22 with a reduced diameter, externally threaded bottom end 23 for mounting in a threaded opening 24 in the body 1. The usual hexagonal wrench grip 25 is provided on the bonnet 22 for inserting and removing the bonnet. The bonnet 22 defines a casing for an elongated valve stem 26. The middle portion 27 of each valve stem 26 is threaded for rotation in an internally threaded adjuster sleeve 28. The sleeve 28 is externally threaded for mounting in the bonnet 22 and for receiving a locknut 29 to lock the sleeve 28 in the bonnet. An annular packing 31 (one shown) is provided between the bottom end of the sleeve 28 and an internal shoulder 32 in each bonnet 22. A handle 34 is provided on the top or outer end of each valve stem 26.

Figure 3:
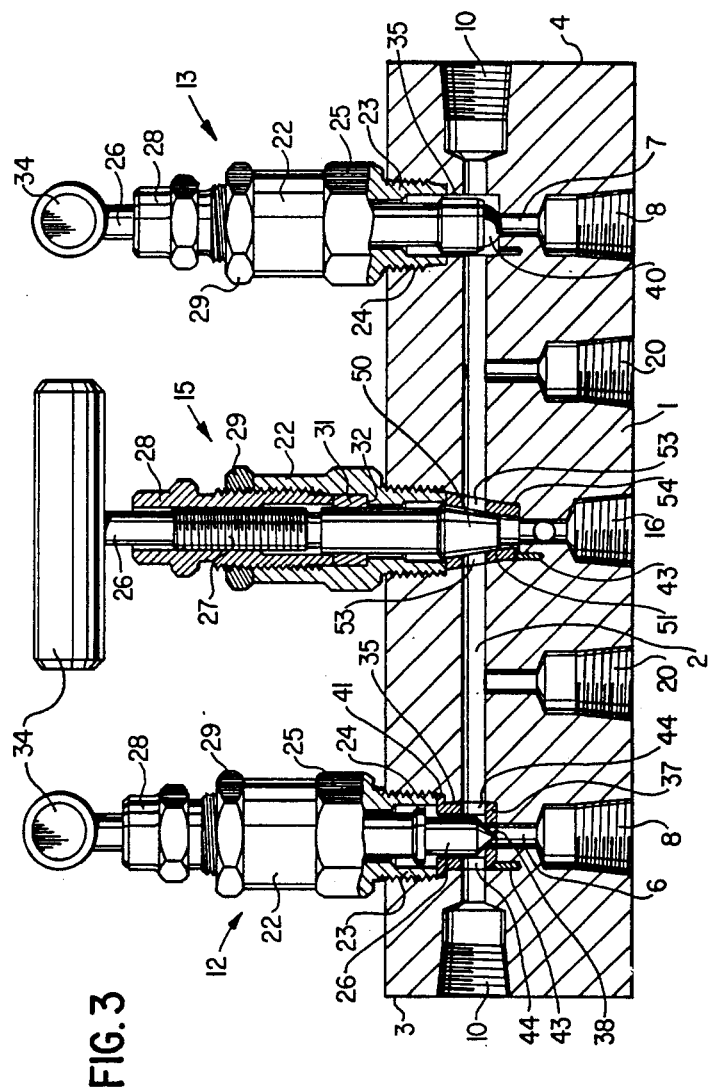
FIG. 3 is a longitudinal sectional view taken generally along line III—III of FIG. 2.

In the case of the valves 12 and 13, a cylindrical counterbore 35 intersecting the flow passage is provided in the body 1 at the bottom of the opening 24. In the valve 12 a flexible cylindrical valve seat 37 is inserted into the counterbore 35 for receiving the cylindrical valve stem 26. A conical bottom end of the valve stem 26 seats in an opening 38 in the bottom of the seat 37 when the valve 12 is closed. The conical bottom end of the valve stem 26 permits uninterrupted flow of fluid between the outlet 10 and the passage 2 even when the valve 12 is closed (FIG. 3). The same is true of the ball 40 on the valve stem 26 of the valve 13. An annular flange 41 on the top end of the valve seat 37 rests on a shoulder at the top of the counterbore 35 providing a seal between the bonnet 22 and the body 1 and retaining the seat 37 in the body. A locking pin 43 in the bottom of the counterbore 35 extends into a notch in the seat 37 for ensuring alignment of openings 44 in opposite sides of the seat 37 with the passage 2, i.e. to ensure unrestricted flow of process fluid.

The flexible or soft seat 37 can be replaced when worn. The flange 41 on the seat 37 avoids metal-to-metal contact between the bonnet 22 and the body 1 in the area of the counterbore 35. With metal-to-metal contact, repeated removal and replacement of the bonnet 22, for replacement of the soft seat 37, would result in galling, ruining the seal between the bonnet and the body 1. The valve 13, which does not include a soft seat between the stem 26 and the seat or between the bonnet 22 and top end of the counterbore 35 would be susceptible to such wear.

The bottom end 50 of the stem 26 of the equalizing valve 15 is frusto-conical for seating in a flexible or soft seat 51. Like the seat 37 the seat 51 has two opposed openings 53 aligned with the flow passage 2. The seat 51 is held in position by a pin 43 and by the bottom end of the bonnet 22. With the valve 15, sealing is effected by compressing the seat 51 between the bottom end 50 of the stem 26 and the frusto-conical counterbore 54 which contains the seat. In the closed position the equalizing valve 15 prevents the flow of fluid through the passage 2 and from the passage 2 into the vent passage 16.

As shown in FIG. 3 the bottom end of the seat 51 of the valve 15 is cylindrical for receiving the pin 43. If the seat 51 tapered uniformly throughout its length, the top end of the pin 43 would normally be relatively close to the inner surface of the seat. As the seat 51 becomes worn it is possible that the bottom end 50 of the stem 26 will engage the pin 43. Thus, the valve stem 26 would be deflected i.e. misaligned with the seat 51, resulting in poor or ineffective sealing. By using a cylindrical bottom end on the seat 51 the life expectancy of such seat is increased. As shown in FIG. 4 the structure of the vent valve is similar to that of the valve 13 i.e. the valve stem 26 of the vent valve 18 includes a hemispherical inner end 40 for closing the vent passage 16.

MANIFOLD OPERATION

In operation, with the valves 12 and 13 closed, no process fluid can flow to the recording or other measuring instrument. When the valves 12 and 13 are opened proceed fluid flows through the inlets into the passage 2 and through outlets 10 to the instrument. During such periods the equalizer valve 15 is closed with respect to the passage 2 to ensure differential pressures in the outlets 10 and closed with respect to the vent passage 16. The vent valve 18 is open. In order to vent or evacuate the manifold the valves 12, 13 and 18 are closed, the equalizer valve 15 is opened with respect to the vent passage 16 and the vent valve 18 is opened. During venting of the instrument, process fluid must be free to flow through the valves 12 and 13, and through the passage 2. As shown in FIG. 3 such flow is achieved by providing a radial clearance between the bottom or inner end of the valve stem 26 and cylindrical counterbore 35 of each valve 12 and 13.

Thus it will be appreciated that process fluid can readily be evacuated from the manifold without removal of the line pressure coupling or fitting (not shown) from the inlet passages 6 and 7. Moreover, any leakage of fluid through the equalizer valve 15 can be determined by connecting the vent passage 16 to a gauge (not shown) and opening the vent valve 18. The use of a single equalizer valve 15 avoids the necessity of opening two equalizer valves, as is the case with a five valve manifold. Thus the pressure of the process fluid in the manifold cannot be unbalanced and damage to the recording instrument is avoided.

What I claim is:

1. A four valve manifold for use with a flow meter or other instrument comprising body means, a flow passage extending longitudinally through said body means; a pair of inlet passages in said body means for introducing process fluid into said flow passage; a pair of outlet passages in said body means for discharging process fluid from said flow passage; a pair of line block valves for opening or closing said inlet passages while permitting process fluid to flow through said flow passage; a vent passage in fluid communication with said flow passage, and a vent valve for controlling the venting of fluid from said vent passage; and an equalizer valve between said line block valves for simultaneously closing said flow passge between said line block valves and said vent passage upstream of said vent valve.

2. A valve manifold according to claim 1 wherein said equalizer valve is normally closed with respect to said flow passage means to prohibit the flow of fluid between said line block valves and closed with respect to said vent passage.

3. A valve manifold according to claim 2 wherein said equalizer valve includes a frusto-conical valve stem; a first, frusto-conical valve seat in said body means, said first valve seat having opposed radially extending openings to said flow passage and an axial opening into said vent passage.

4. A valve manifold according to claim 3 wherein said equalizer valve includes first pin means for connecting said first valve seat to said body means to prevent rotation of said first valve seat in said body means.

5. A valve manifold according to claim 4 wherein said first valve seat includes a cylindrical inner portion for receiving said first pin means.

6. A valve manifold according to claim 2 wherein each of said line block valves includes a second cylindrical valve stem, a second cylindrical valve seat in said body means, opposed, radially extending openings in said second valve seat for connecting said flow passage to said outlet passages; and an axially extending opening in said second valve seat for receiving said second valve stem to close the inlet passage with respect to the outlet passage.

7. A valve manifold according to claim 6 wherein said second valve stem includes a conical inner end for closing said inlet passage with respect to said outlet passage while permitting fluid flow between said flow passage and said outlet passage.

8. A valve manifold according to claim 6 wherein said second valve stem includes a hemispherical inner end for closing said inlet passage with respect to said outlet passage while permitting fluid to flow from said flow passage to said outlet passage.

* * * * *